United States Patent
Hendrickson

(10) Patent No.: US 11,007,502 B2
(45) Date of Patent: May 18, 2021

(54) METHODS AND SYSTEMS FOR CAPTURING PARTICULATES

(71) Applicant: Chevron Phillips Chemical Company LP, The Woodlands, TX (US)

(72) Inventor: Gregory G. Hendrickson, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 335 days.

(21) Appl. No.: 15/970,056

(22) Filed: May 3, 2018

(65) Prior Publication Data

US 2019/0336934 A1 Nov. 7, 2019

(51) Int. Cl.
| | | |
|---|---|---|
| *B01J 19/08* | (2006.01) | |
| *B06B 1/02* | (2006.01) | |
| *B01L 3/00* | (2006.01) | |
| *B03C 3/016* | (2006.01) | |

(52) U.S. Cl.
CPC ....... *B01J 19/087* (2013.01); *B01L 3/502761* (2013.01); *B06B 1/0276* (2013.01); *B01J 2219/00234* (2013.01); *B03C 3/016* (2013.01)

(58) Field of Classification Search
CPC combination set(s) only.
See application file for complete search history.

(56) References Cited

U.S. PATENT DOCUMENTS

| | | | |
|---|---|---|---|
| 4,743,361 A | | 5/1988 | Schram |
| 4,759,775 A | * | 7/1988 | Peterson ................. A61M 1/36 |
| | | | 210/188 |
| 4,877,516 A | * | 10/1989 | Schram ................ B01D 21/283 |
| | | | 209/155 |
| 4,948,497 A | | 8/1990 | Ohkawa |
| 4,983,189 A | * | 1/1991 | Peterson ................. A61M 1/36 |
| | | | 210/188 |
| 5,225,089 A | * | 7/1993 | Benes ................. B01D 21/283 |
| | | | 210/188 |
| 5,419,877 A | * | 5/1995 | Goforth ............... B01D 49/006 |
| | | | 23/313 R |
| 5,527,460 A | * | 6/1996 | Trampler ............. B01D 21/283 |
| | | | 209/155 |
| 5,626,767 A | * | 5/1997 | Trampler ............. B01D 21/283 |
| | | | 210/748.05 |

(Continued)

FOREIGN PATENT DOCUMENTS

WO    2000/041794 A1    7/2000

OTHER PUBLICATIONS

G. Whitworth, M.A. Grundy, W.T. Coakley; Transport and harvesting of suspended particles using modulated ultrasound; Sep. 18, 2002; pp. 439-444. (Year: 2002).*

(Continued)

*Primary Examiner* — Christopher P Jones
*Assistant Examiner* — Sonji Turner
(74) *Attorney, Agent, or Firm* — Eversheds Sutherland (US) LLP

(57) ABSTRACT

Provided herein are methods of capturing particulates. The methods may include contacting particulates in a gas stream with one or more acoustic waves. The one or more acoustic waves may include standing waves or waves of modulating frequency. The methods may include promoting agglomeration of particulates with an electrostatic force. Also provided herein are systems for capturing particulates.

12 Claims, 3 Drawing Sheets

(56) References Cited

U.S. PATENT DOCUMENTS

Figure 1:
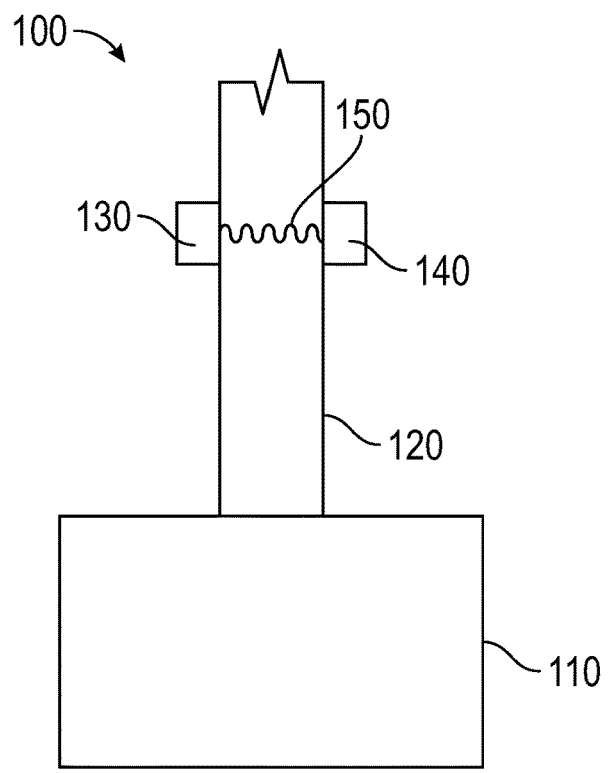

| | | | | |
|---|---|---|---|---|
| 5,711,888 | A * | 1/1998 | Trampler | B01D 21/283 210/748.05 |
| 6,929,750 | B2 * | 8/2005 | Laurell | A61M 1/3496 210/708 |
| 7,340,957 | B2 * | 3/2008 | Kaduchak | B01D 21/28 73/570.5 |
| 7,634,937 | B2 | 12/2009 | Burdett et al. | |
| 7,947,797 | B2 | 5/2011 | Muhle et al. | |
| 9,272,234 | B2 * | 3/2016 | Lipkens | B01D 43/00 |
| 9,533,241 | B2 * | 1/2017 | Presz, Jr. | B01D 21/283 |
| 9,550,134 | B2 | 1/2017 | Lipkens et al. | |
| 9,675,902 | B2 * | 6/2017 | Lipkens | C12M 47/02 |
| 9,745,548 | B2 * | 8/2017 | Lipkens | C12M 47/10 |
| 9,764,304 | B2 * | 9/2017 | Chen | B01J 19/10 |
| 2002/0036173 | A1 | 3/2002 | Feke et al. | |
| 2003/0015035 | A1 * | 1/2003 | Kaduchak | B01D 49/006 73/570.5 |
| 2004/0226437 | A1 * | 11/2004 | Stenersen | B01D 19/0078 95/29 |
| 2008/0217259 | A1 * | 9/2008 | Siversson | A61M 1/3693 436/177 |
| 2008/0245745 | A1 * | 10/2008 | Ward | G01N 1/4077 209/590 |
| 2008/0272034 | A1 * | 11/2008 | Ferren | G01N 1/4077 210/96.1 |
| 2009/0101547 | A1 | 4/2009 | Cefai et al. | |
| 2009/0194420 | A1 * | 8/2009 | Mariella, Jr. | B01D 17/06 204/547 |
| 2009/0252658 | A1 * | 10/2009 | Ramler | B01J 19/0093 422/140 |
| 2010/0139377 | A1 * | 6/2010 | Huang | G01N 15/1404 73/61.75 |
| 2010/0206818 | A1 * | 8/2010 | Leong | B01D 21/283 210/748.05 |
| 2012/0329122 | A1 * | 12/2012 | Lipkens | C12M 47/02 435/173.7 |
| 2013/0302213 | A1 * | 11/2013 | Lipkens | B01D 17/04 422/119 |
| 2014/0008307 | A1 * | 1/2014 | Guldiken | B01L 3/502761 210/748.05 |
| 2014/0011240 | A1 * | 1/2014 | Lipkens | H01L 41/053 435/71.1 |
| 2015/0209695 | A1 * | 7/2015 | McCarthy | B01D 17/04 210/748.05 |
| 2015/0274550 | A1 * | 10/2015 | Lipkens | B01D 17/045 210/708 |
| 2015/0321129 | A1 * | 11/2015 | Lipkens | B01D 43/00 210/748.05 |
| 2016/0002070 | A1 * | 1/2016 | Lipkens | B01D 21/0045 422/128 |
| 2016/0059206 | A1 * | 3/2016 | Chen | G01N 1/4077 210/748.05 |
| 2016/0129370 | A1 * | 5/2016 | Lipkens | C12M 47/02 422/119 |
| 2016/0279540 | A1 * | 9/2016 | Presz, Jr. | B01D 21/283 |
| 2016/0339360 | A1 * | 11/2016 | Lipkens | B01D 17/00 |
| 2017/0066015 | A1 * | 3/2017 | Lipkens | B06B 1/0622 |
| 2017/0088809 | A1 * | 3/2017 | Lipkens | B06B 1/0223 |
| 2017/0128857 | A1 * | 5/2017 | Lipkens | B06B 1/0276 |
| 2017/0173498 | A9 * | 6/2017 | Lipkens | C12M 47/02 |
| 2017/0282097 | A1 * | 10/2017 | Lipkens | B01D 43/00 |

OTHER PUBLICATIONS

Pall Purchases Exclusive License for Cutting Edge Acoustic Wave Separation Technology, Jun. 15, 2015 (2 pages).

* cited by examiner

METHODS AND SYSTEMS FOR CAPTURING PARTICULATES

FIELD OF THE INVENTION

The present disclosure relates to methods and systems for capturing particulates, including methods and systems that rely at least in part on acoustic waves.

BACKGROUND

Particulates are entrained in flowing gas streams in a number of applications. Therefore, a variety of techniques have been developed to separate the particulates from the flowing gas streams. For example, gas-solid separation techniques have been developed that rely at least in part on cyclones, filters, or electrostatic precipitators. These techniques collect the solid particulates after the particulates have exited a source processing vessel. Therefore, if the particulates are to be recycled, then additional equipment and/or expense is needed to return the collected particulates to the source processing vessel. If the intent is to dispose of the collected particulates, then additional equipment and/or expense is still required, and the particulates are wasted.

There remains a need for methods or systems of capturing particulates that are more efficient and/or profitable, reduce particulate flow from a source vessel, reduce or eliminate the need for post-treatment of a gas stream containing particulates, ease the recycling of the particulates, or a combination thereof.

BRIEF SUMMARY OF THE INVENTION

Provided herein are methods and systems of capturing particulates that overcome one or more of the foregoing disadvantages.

In one aspect, methods of capturing particulates are provided. In aspects, the methods include providing a gas stream in a channel having a longitudinal axis, the gas stream having a velocity and including particulates; and contacting the particulates with one or more acoustic waves having an intensity and a modulating frequency to transport at least a portion of the particulates transversely to the longitudinal axis to a quiescent zone of the channel. In some aspects, the channel includes a first section hosting the gas stream, and a second section including a substantially stationary gas, wherein the at least a portion of the particulates transported to the quiescent zone are deposited in the second section of the channel.

In aspects, the methods of capturing particulates include providing a gas stream in a channel having a longitudinal axis, the gas stream including particulates; contacting the particulates with one or more standing acoustic waves extending transverse to the longitudinal axis to immobilize at least a portion of the particulates; and contacting the at least a portion of the particulates with an electrostatic force to (i) transport the at least a portion of the particulates to a quiescent zone of the channel, (ii) promote agglomeration of the at least a portion of the particulates, or (iii) a combination thereof.

In another aspect, systems for capturing particulates are provided. In aspects, the systems include a chemical apparatus; a gas stream channel having a longitudinal axis associated with the chemical apparatus; and two or more transducers associated with the gas stream channel; wherein the two or more transducers are configured to provide one or more acoustic waves in the gas stream channel, transversely to the longitudinal axis. In some aspects, the systems also include an apparatus for providing an electrostatic force in the gas stream channel. The one or more acoustic waves may include a standing acoustic wave.

BRIEF DESCRIPTION OF THE DRAWINGS

The following figures form part of the present specification, and are included to further demonstrate certain aspects of the present disclosure. The invention may be better understood by reference to one or more of these figures in combination with the detailed description of specific embodiments presented herein.

FIG. 1 depicts one aspect of a system for collecting particulates.

FIG. 2 depicts one aspect of a system for collecting particulates, the system including a quiescent zone.

FIG. 3 depicts one aspect of a system for collecting particulates, the system including an apparatus for applying an electrostatic force.

FIG. 4 depicts one aspect of a system for collecting particulates, the system including a quiescent zone.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

Provided herein are systems and methods for capturing particulates. As used herein, the phrase "capturing particulates" generally refers to influencing, in any manner, the movement of particulates, the position of particulates, or a combination thereof. In some aspects, the methods include (i) providing a gas stream in a channel having a longitudinal axis, the gas stream having a velocity and including particulates; and (ii) contacting the particulates with one or more acoustic waves having an intensity and a modulating frequency to transport at least a portion of the particulates transversely to the longitudinal axis to a quiescent zone of the channel. In further aspects, the gas stream having a velocity flows substantially parallel to the longitudinal axis of the channel. In additional aspects, the channel includes a first section hosting the gas stream, and a second section including a substantially stationary gas, wherein the at least a portion of the particulates transported to the quiescent zone are deposited in the second section of the channel. As used herein, the phrase "quiescent zone" generally refers to an area at which a force exerted on a particulate is less than the force that would be exerted on the particulate at one or more adjacent areas.

In some aspects, the systems for capturing particulates include a chemical apparatus; a gas stream channel having a longitudinal axis associated with the chemical apparatus; and two or more transducers associated with the gas stream channel; wherein the two or more transducers are configured to provide one or more acoustic waves in the gas stream channel, transversely to the longitudinal axis. In additional aspects, the system also includes an apparatus for providing an electrostatic force in the gas stream channel.

The chemical apparatus generally may include any equipment for storing and/or transporting a material, performing a chemical reaction or process, or a combination thereof. In some aspects, the chemical apparatus includes a hopper containing particulates, an extruder feed conveying blender, a calcination vessel for catalysts, or a fluidized bed reactor.

The hopper containing particulates may be an additive feed hopper. The hopper may be configured to be refilled manually. The hopper may include one or more vents routed to a dust collection system, such as a vent filter. One or more of the systems provided herein may be associated with the one or more vents of the hopper. The systems provided herein may replace or supplement a dust collection system.

In some aspects, the extruder feed conveying blender includes one or more vents routed to a dust collection system, such as a vent filter.

Generally, the one or more vents of the chemical apparatus may have a largest dimension of about 3 inches to about 10 inches, or about 3 inches to about 8 inches. In some aspects, the one or more vents have a cross-sectional area of about 7 square inches to about 75 square inches, or about 9 square inches to about 64 square inches.

In some aspects, the chemical apparatus includes a vent filter. The vent filter may be configured to remove particulates less than 2 microns in diameter.

In some aspects, the fluidized bed reactor includes a catalyst activator or a polymerization reactor. The catalyst activator may be a polymerization catalyst activator. An example of a fluidized bed reactor is provided at U.S. Pat. No. 7,947,797, which is incorporated by reference.

In some aspects, the gas stream channel hosts a gas stream including one or more chemical additives initially disposed in the hopper. In further aspects, the gas stream channel hosts a gas stream that includes particulates entrained in a fluid of the fluidized bed reactor.

An aspect of a system for collecting particulates is depicted at FIG. 1. The system 100 depicted at FIG. 1 includes a chemical apparatus 110 and a gas stream channel 120 associated with the chemical apparatus 110 in which gas flow is parallel to the longitudinal axis of the gas stream channel 120. A first transducer 130 and a second transducer 140 are associated with the gas stream channel 120. The first transducer 130 and the second transducer 140 provide one or more acoustic waves 150 in the gas stream channel 120. The one or more acoustic waves 150 may include a standing wave or waves of modulating frequency.

Figure 2:
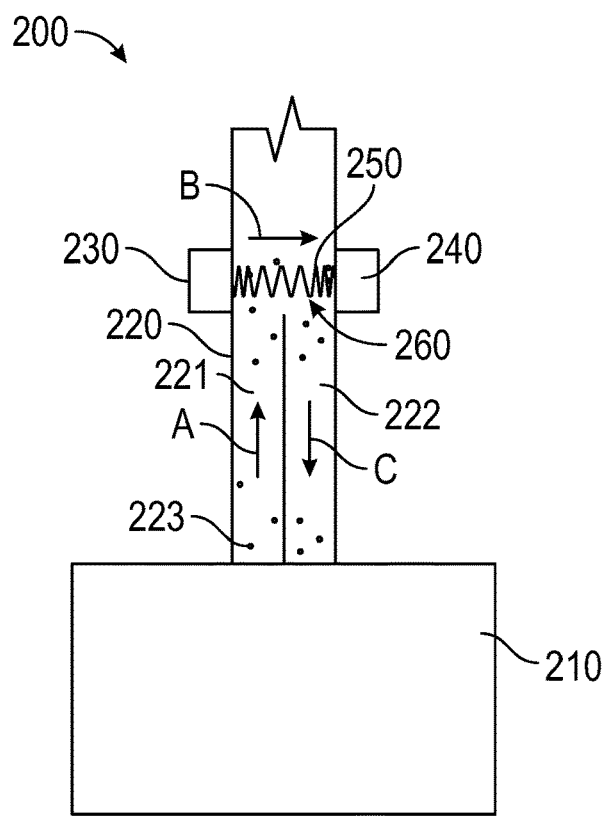
Figure 4:
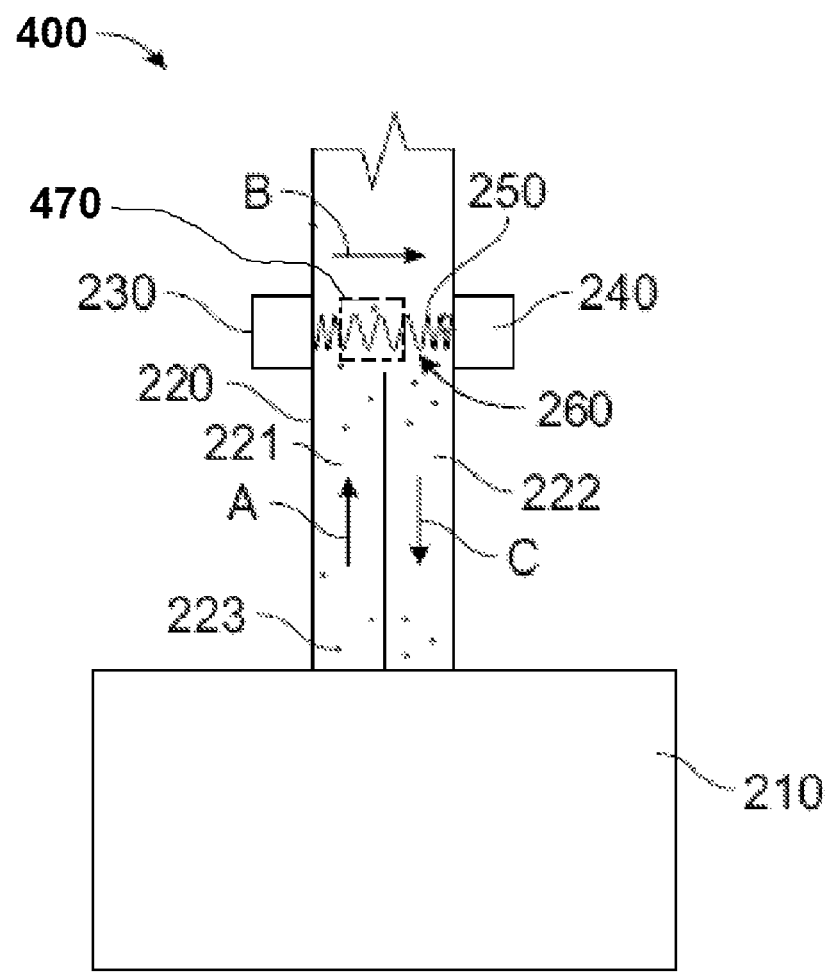

An aspect of a system for collecting particulates is depicted at FIG. 2. The system 200 depicted at FIG. 2 includes a chemical apparatus 210 and a gas stream channel 220 associated with the chemical apparatus 210. The gas stream channel 220 includes a first section 221 hosting a gas stream from the chemical apparatus 210, and a second section 222 that includes substantially stationary gas. The gas stream includes particulates 223 that are transported by the gas stream (Arrow "A"). A first transducer 230 and a second transducer 240 are associated with the gas stream channel 220. The first transducer 230 and the second transducer 240 provide one or more acoustic waves 250 in the gas stream channel 220. The one or more acoustic waves 250 of the aspect depicted at FIG. 2 have an intensity and a modulating frequency effective to transport the particulates 223 (Arrow "B") to a quiescent zone 260 of the gas stream channel 220. At least a portion of the particulates 223 are then deposited in the second section 222, and returned (Arrow "C") to the chemical apparatus 210. Alternatively, the system of FIG. 2 may include a third transducer. For example, the system 400 depicted at FIG. 4 is identical to the system 200 of FIG. 2, except for the inclusion of a third transducer 470 in the system 400. The third transducer 470 is arranged on the back side of the gas stream channel 220.

Figure 3:
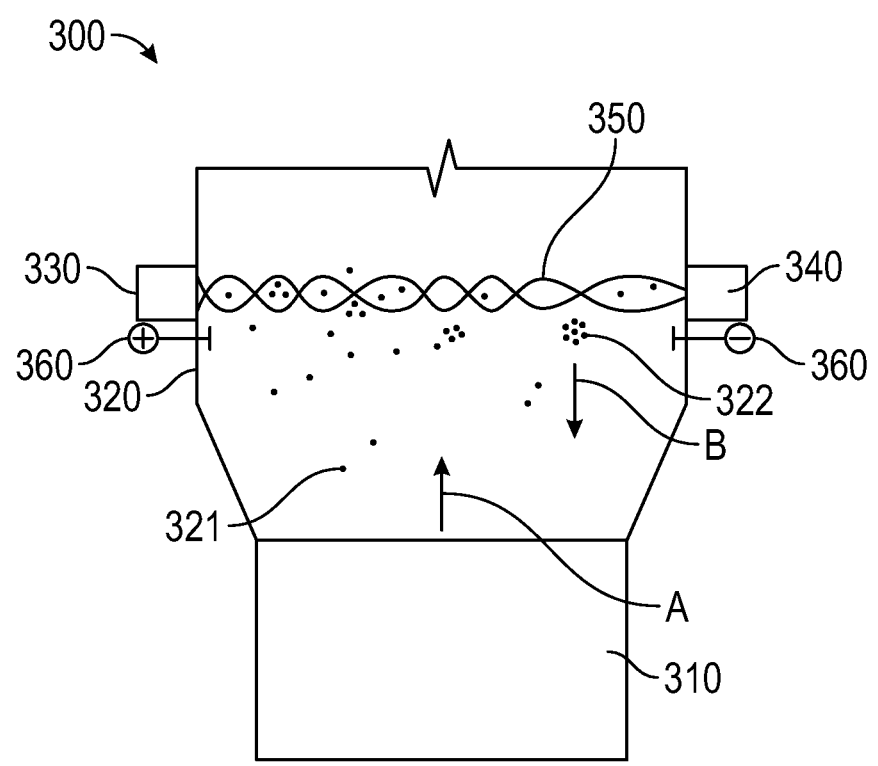

An aspect of a system for collecting particulates is provided at FIG. 3. The system 300 includes a chemical apparatus 310 and a gas stream channel 320 associated with the chemical apparatus 310. The gas stream channel 320 hosts a gas stream having a direction that carries particulates 321 (Arrow "A") from the chemical apparatus 310. A first transducer 330 and a second transducer 340 are associated with the gas stream channel 320. Also associated with the gas stream channel 320 is an apparatus 360 for applying an electrostatic force to the particulates 321 in the gas stream channel 321. The first transducer 330 and the second transducer 340 provide one or more standing acoustic waves 350 in the gas stream channel 320 that entrap at least a portion of the particulates 321 that contact the one or more standing acoustic waves 350. The electrostatic force applied by the apparatus 360 promotes the formulation of particulate agglomerates 322. The particulate agglomerates 322 may travel downward (Arrow "B") in the gas stream channel 320 when they attain a particular mass.

Generally, the methods and systems provided herein may be used for capturing any particulates that may be influenced, in any manner, by the waves and/or forces disclosed herein. The particulates generally may have any size that permits the particulates to be influenced, in any manner, by the waves and/or forces disclosed herein. As used herein, the term "particulates" refers to any material in the form of particles. The particulates generally may be of uniform or non-uniform size. The particulates generally may be of uniform or non-uniform shape. For example, the particulates may be substantially spherical, non-spherical, or include both non-spherical and substantially spherical particulates.

In some aspects, the particulates have an average particulate size of about 1 µm to about 110 µm, about 1 µm to about 105 µm, about 2 µm to about 105 µm, about 2 µm to about 100 µm, about 2 µm to about 90 µm, about 2 µm to about 80 µm, about 2 µm to about 70 µm, about 2 µm to about 60 µm, about 2 µm to about 50 µm, about 2 µm to about 40 µm, about 2 µm to about 30 µm, about 2 µm to about 20 µm, about 2 µm to about 10 µm, about 5 µm to about 105 µm, about 5 µm to about 100 µm, about 5 µm to about 90 µm, about 5 µm to about 80 µm, about 5 µm to about 70 µm, about 5 µm to about 60 µm, about 5 µm to about 50 µm, about 5 µm to about 40 nm, about 5 µm to about 30 µm, about 5 µm to about 20 µm, about 5 µm to about 10 µm. As used herein, the phrase "average particulate size" generally refers to the average largest dimension of a sample of particulates. For example, when the particulates include substantially spherical particulates, the average largest dimension is the average diameter of the particulates.

Generally, the methods and systems provided herein may be used for capturing any particulates of any material or combination of materials. In some aspects, the particulates include a phosphite processing stabilizer. In additional aspects, the particulates include IRGAFOX® 168 hydrolytically stable phosphite processing stabilizer (CIBA®, USA). In further aspects, the particulates include an antioxidant stabilizer. In still further aspects, the particulates include IRGANOX® 1010 phenolic antioxidant stabilizer (BASF, USA). The particulates may include polyethylene fines. The particulates may include catalyst fines.

The particulates may be in motion when subjected to the systems and methods provided herein. The motion may be provided by any force, such as a gas stream. In some aspects, the gas stream has a velocity of about 0.5 feet/second to about 16 feet/second, about 0.5 feet/second to about 15 feet/second, about 0.5 feet/second to about 14 feet/second, about 0.5 feet/second to about 13 feet/second, about 0.5 feet/second to about 12 feet/second, about 0.5 feet/second to about 11 feet/second, about 0.5 feet/second to about 10 feet/second, about 0.5 feet/second to about 9 feet/second, about 0.5 feet/second to about 8 feet/second, about 0.5 feet/second to about 7 feet/second, about 0.5 feet/second to about 6 feet/second, about 0.5 feet/second to about 5 feet/second, about 0.5 feet/second to about 4 feet/second, about 0.5 feet/second to about 3 feet/second, about 0.5 feet/second to about 2 feet/second, about 0.75 feet/second to about 16 feet/second, about 0.75 feet/second to about 15 feet/second, about 0.75 feet/second to about 14 feet/second, about 0.75 feet/second to about 13 feet/second, about 0.75 feet/second to about 12 feet/second, about 0.75 feet/second to about 11 feet/second, about 0.75 feet/second to about 10 feet/second, about 0.75 feet/second to about 9 feet/second, about 0.75 feet/second to about 8 feet/second, about 0.75 feet/second to about 7 feet/second, about 0.75 feet/second to about 6 feet/second, about 0.75 feet/second to about 5 feet/second, about 0.75 feet/second to about 4 feet/second, about 0.75 feet/second to about 3 feet/second, about 0.75 feet/second to about 2 feet/second, about 0.5 feet/second to about 16 feet/second, about 0.75 feet/second to about 16 feet/second, about 1 feet/second to about 16 feet/second, about 2 feet/second to about 16 feet/second, about 3 feet/second to about 16 feet/second, about 4 feet/second to about 16 feet/second, about 5 feet/second to about 16 feet/second, about 6 feet/second to about 16 feet/second, about 7 feet/second to about 16 feet/second, about 8 feet/second to about 16 feet/second, about 9 feet/second to about 16 feet/second, about 10 feet/second to about 16 feet/second, about 11 feet/second to about 16 feet/second, about 12 feet/second to about 16 feet/second, or about 13 feet/second to about 16 feet/second.

The gas stream generally may be hosted by a channel. The channel may be associated with an apparatus, such as a chemical apparatus. The phrase "chemical apparatus", as used herein, generally refers to any device or vessel for performing a chemical reaction or process. The channel generally may be of any size and shape, such as, for example, any cross-sectional shape, that permits the particulates to be influenced by one or more forces as provided herein. The channel generally may have a longitudinal axis, and a gas stream may generally move in the direction of the longitudinal axis. For example, the gas stream may flow substantially parallel to the longitudinal axis. In some aspects, the channel having a longitudinal axis has a cross-sectional area of about 3 square inches to about 75 square inches, about 3 square inches to about 70 square inches, about 3 square inches to about 65 square inches, about 3 square inches to about 64 square inches, about 3 square inches to about 60 square inches, about 3 square inches to about 55 square inches, about 3 square inches to about 50 square inches, about 3 square inches to about 45 square inches, about 3 square inches to about 75 square inches, about 4 square inches to about 75 square inches, about 5 square inches to about 75 square inches, about 6 square inches to about 75 square inches, about 7 square inches to about 75 square inches, about 8 square inches to about 75 square inches, about 9 square inches to about 75 square inches, about 3 square inches to about 74 square inches, about 4 square inches to about 74 square inches, about 5 square inches to about 73 square inches, about 5 square inches to about 71 square inches, about 6 square inches to about 69 square inches, about 7 square inches to about 68 square inches, about 8 square inches to about 67 square inches, about 9 square inches to about 65 square inches, or about 9 square inches to about 64 square inches.

The acoustic waves of the methods and systems herein generally may be produced by any one or more devices. In some aspects, the one or more acoustic waves are generated by a first transducer and a second transducer. The first transducer and the second transducer may be spaced apart from each other. The distance between the first transducer and the second transducer may be adjusted to change one or more characteristics of an acoustic wave. In further aspects, the first transducer and the second transducer are adjusted independently to provide the one or more acoustic waves. In additional aspects, the one or more acoustic waves are further generated by a third transducer spaced apart from the first transducer and the second transducer. The third transducer may be adjusted independently.

Generally, the one or more acoustic waves may be generated by any known technique or device, and have any known features, such as those disclosed in U.S. Pat. Nos. 4,743,361, 4,948,497, 7,743,361, 7,634,937, and U.S. Patent Application Publication No. 2002/0036173, which are incorporated herein by reference.

In some aspects, the one or more acoustic waves are standing waves. The standing waves may include multi-dimensional standing waves. In some aspects, the multi-dimensional standing wave includes an acoustic radiation force having an axial force component and a lateral force component that are the same order of magnitude.

In some aspects, the one or more acoustic waves are waves of modulating frequency.

In some aspects, the frequency of the standing waves is selected from one or more frequencies of about 100 kHz to about 100 MHz, about 100 kHz to about 90 MHz, about 100 kHz to about 80 MHz, about 100 kHz to about 70 MHz, about 100 kHz to about 60 MHz, about 100 kHz to about 50 MHz, about 100 kHz to about 45 MHz, about 200 kHz to about 45 MHz, about 300 kHz to about 45 MHz, about 400 kHz to about 45 MHz, about 500 kHz to about 45 MHz, about 600 kHz to about 45 MHz, about 700 kHz to about 45 MHz, or about 800 kHz to about 45 MHz. In additional aspects, the modulating frequency is selected from two or more frequencies of about 100 kHz to about 100 MHz, about 100 kHz to about 90 MHz, about 100 kHz to about 80 MHz, about 100 kHz to about 70 MHz, about 100 kHz to about 60 MHz, about 100 kHz to about 50 MHz, about 100 kHz to about 45 MHz, about 200 kHz to about 45 MHz, about 300 kHz to about 45 MHz, about 400 kHz to about 45 MHz, about 500 kHz to about 45 MHz, about 600 kHz to about 45 MHz, about 700 kHz to about 45 MHz, or about 800 kHz to about 45 MHz. Not wishing to be bound by any particular theory, it is believed that, in general, a greater frequency may be selected as the average particulate size decreases in order to increase the likelihood and/or efficiency of influencing the particulates. As used herein, the unit "kHz" indicates $10^3$ Hz (i.e., 1 kHz is equal to 1,000 Hz); and the unit "MHz" refers to $10^6$ Hz (i.e., 1 MHz is equal to 1,000,000 Hz).

In some aspects, the particulates have an average particulate size of about 2 μm to about 105 μm, and a modulating frequency is selected from two or more frequencies of about 100 kHz to about 100 MHz.

In some aspects, the methods provided herein include adjusting one or more of the gas stream velocity, the intensity, and/or the modulating frequency to transport the at least a portion of the particulates. In further aspects, methods provided herein include adjusting the gas stream velocity to transport the at least a portion of the particulates. In additional aspects, the methods provided herein include adjusting the gas stream velocity, and the intensity to transport the at least a portion of the particulates. In still further aspects, the methods provided herein include adjusting the gas stream velocity, and the modulating frequency to transport the at least a portion of the particulates. In still further aspects, the methods provided herein include adjusting the gas stream velocity, the intensity, and the modulating frequency to transport the at least a portion of the particulates. In other aspects, the methods provided herein include adjusting the intensity to transport the at least a portion of the particulates. The methods provided herein may include adjusting the modulating frequency to transport the at least a portion of the particulates. The methods provided herein may include adjusting the intensity and the modulating frequency to transport the at least a portion of the particulates.

While certain aspects of conventional technologies have been discussed to facilitate disclosure of various aspects, Applicant in no way disclaims these technical aspects, and it is contemplated that the present disclosure may encompass one or more of the conventional technical aspects discussed herein.

The present disclosure may address one or more of the problems and deficiencies of known methods and processes. However, it is contemplated that various aspects may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Regarding claim transitional terms or phrases, the transitional term “comprising”, which is synonymous with “including”, “containing”, or “characterized by” is inclusive or open-ended and does not exclude additional, un-recited elements or method steps. The transitional phrase “consisting of” excludes any element, step, or ingredient not specified in the claim. The transitional phrase “consisting essentially of” limits the scope of a claim to the specified materials or steps and those that do not materially affect the basic and novel characteristic(s) of the claimed invention. A “consisting essentially of” claim occupies a middle ground between closed claims that are written in a “consisting of” format and fully open claims that are drafted in a “comprising” format. Absent an indication to the contrary, when describing a compound or composition “consisting essentially of” is not to be construed as “comprising,” but is intended to describe the recited component that includes materials which do not significantly alter composition or method to which the term is applied. When a claim includes different features and/or feature classes (for example, a method step, and/or product features, among other possibilities), the transitional terms comprising, consisting essentially of, and consisting of, apply only to the feature class to which is utilized and it is possible to have different transitional terms or phrases utilized with different features within a claim. While compositions and methods are described in terms of “comprising” various components or steps, the compositions and methods can also “consist essentially of” or “consist of” the various components or steps.

The articles “a” and “an” may be employed in connection with various elements and components of compositions, processes or structures described herein. This is merely for convenience and to give a general sense of the compositions, processes or structures. Such a description includes “one or at least one” of the elements or components. Moreover, as used herein, the singular articles also include a description of a plurality of elements or components, unless it is apparent from a specific context that the plural is excluded.

“Optional” or “optionally” means that the subsequently described event or circumstance can or cannot occur, and that the description includes instances where the event or circumstance occurs and instances where it does not.

The terms “configured for use” or “adapted for use” and similar language is used herein to reflect that the particular recited structure or procedure is used in a system or process as disclosed herein.

The term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is “about” or “approximate” whether or not expressly stated to be such. The term “about” also encompasses amounts that differ due to different equilibrium conditions for a composition resulting from a particular initial mixture. Whether or not modified by the term “about”, the claims include equivalents to the quantities. The term “about” may mean within 10% of the reported numerical value, or within 5% of the reported numerical value, or within 2% of the reported numerical value.

As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

Various numerical ranges may be disclosed herein. When Applicant discloses or claims a range of any type, Applicant’s intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some aspects, that the gas stream has a velocity of about 11 feet/second to about 16 feet/second. This range should be interpreted as encompassing pressures of about 11 feet/second and about 16 feet/second, and further encompasses “about” each of 12 feet/second, 13 feet/second, 14 feet/second, and 15 feet/second, including any ranges and sub-ranges between any of these values.

Applicant reserves the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual elements of a claimed genus or subgenus, if for any reason Applicants choose to claim less than the full measure of the disclosure, for example, to account for a reference that Applicants can be unaware of at the time of the filing of the application.

ASPECTS

Non-limiting aspects of the methods and systems provided herein include the following:

Aspect 1—A method of capturing particulates, the method including (i) providing a gas stream in a channel having a longitudinal axis, the gas stream having a velocity and including particulates; and (ii) contacting the particulates with one or more acoustic waves having an intensity and a modulating frequency to transport at least a portion of the particulates transversely to the longitudinal axis to a quiescent zone of the channel.

Aspect 2—The method of aspect 1, wherein the gas stream having a velocity flows substantially parallel to the longitudinal axis of the channel.

Aspect 3—The method of aspect 1 or 2, wherein the channel includes a first section hosting the gas stream, and a second section including a substantially stationary gas, wherein the at least a portion of the particulates transported to the quiescent zone are deposited in the second section of the channel.

Aspect 4—The method of any one of aspects 1-3, further including separating the particulates from the gas stream.

Aspect 5—The method of any one of aspects 1-4, wherein the particulates have an average particulate size of about 1 μm to about 110 μm.

Aspect 6—The method of any one of aspects 1-4, wherein the particulates have an average particulate size of about 1 μm to about 105 μm.

Aspect 7—The method of any one of aspects 1-4, wherein the particulates have an average particulate size of about 2 μm to about 105 μm.

Aspect 8—The method of any one of aspects 1-4, wherein the particulates have an average particulate size of about 2 μm to about 100 μm.

Aspect 9—The method of any one of aspects 1-4, wherein the particulates have an average particulate size of about 2 μm to about 90 μm.

Aspect 10—The method of any one of aspects 1-4, wherein the particulates have an average particulate size of about 2 μm to about 80 μm.

Aspect 11—The method of any one of aspects 1-4, wherein the particulates have an average particulate size of about 2 μm to about 70 μm.

Aspect 12—The method of any one of aspects 1-4, wherein the particulates have an average particulate size of about 2 μm to about 60 μm.

Aspect 13—The method of any one of aspects 1-4, wherein the particulates have an average particulate size of about 2 μm to about 50 μm.

Aspect 14—The method of any one of aspects 1-4, wherein the particulates have an average particulate size of about 2 μm to about 40 μm.

Aspect 15—The method of any one of aspects 1-4, wherein the particulates have an average particulate size of about 2 μm to about 30 μm.

Aspect 16—The method of any one of aspects 1-4, wherein the particulates have an average particulate size of about 2 μm to about 20 μm.

Aspect 17—The method of any one of aspects 1-4, wherein the particulates have an average particulate size of about 2 μm to about 10 μm.

Aspect 18—The method of any one of aspects 1-4, wherein the particulates have an average particulate size of about 5 μm to about 105 μm.

Aspect 19—The method of any one of aspects 1-4, wherein the particulates have an average particulate size of about 5 μm to about 100 μm.

Aspect 20—The method of any one of aspects 1-4, wherein the particulates have an average particulate size of about 5 μm to about 90 μm.

Aspect 21—The method of any one of aspects 1-4, wherein the particulates have an average particulate size of about 5 μm to about 80 μm.

Aspect 22—The method of any one of aspects 1-4, wherein the particulates have an average particulate size of about 5 μm to about 70 μm.

Aspect 23—The method of any one of aspects 1-4, wherein the particulates have an average particulate size of about 5 μm to about 60 μm.

Aspect 24—The method of any one of aspects 1-4, wherein the particulates have an average particulate size of about 5 μm to about 50 μm.

Aspect 25—The method of any one of aspects 1-4, wherein the particulates have an average particulate size of about 5 μm to about 40 μm.

Aspect 26—The method of any one of aspects 1-4, wherein the particulates have an average particulate size of about 5 μm to about 30 μm.

Aspect 27—The method of any one of aspects 1-4, wherein the particulates have an average particulate size of about 5 μm to about 20 μm.

Aspect 28—The method of any one of aspects 1-4, wherein the particulates have an average particulate size of about 5 μm to about 10 μm.

Aspect 29—The method of any one of aspects 1-28, wherein the particulates include a phosphite processing stabilizer.

Aspect 30—The method of any one of aspects 1-29, wherein the particulates include IRGAFOX® 168 hydrolytically stable phosphite processing stabilizer (CIBA®, USA).

Aspect 31—The method of any one of aspects 1-30, wherein the particulates include an antioxidant stabilizer.

Aspect 32—The method of any one of aspects 1-31, wherein the particulates include IRGANOX® 1010 phenolic antioxidant stabilizer (BASF, USA).

Aspect 33—The method of any one of aspects 1-32, wherein the particulates include polyethylene fines, catalyst fines, or a combination thereof.

Aspect 34—The method of any one of aspects 1-33, wherein the gas stream has a velocity of about 0.5 feet/second to about 16 feet/second.

Aspect 35—The method of any one of aspects 1-33, wherein the gas stream has a velocity of about 0.5 feet/second to about 15 feet/second.

Aspect 36—The method of any one of aspects 1-33, wherein the gas stream has a velocity of about 0.5 feet/second to about 14 feet/second.

Aspect 37—The method of any one of aspects 1-33, wherein the gas stream has a velocity of about 0.5 feet/second to about 13 feet/second.

Aspect 38—The method of any one of aspects 1-33, wherein the gas stream has a velocity of about 0.5 feet/second to about 12 feet/second.

Aspect 39—The method of any one of aspects 1-33, wherein the gas stream has a velocity of about 0.5 feet/second to about 11 feet/second.

Aspect 40—The method of any one of aspects 1-33, wherein the gas stream has a velocity of about 0.5 feet/second to about 10 feet/second.

Aspect 41—The method of any one of aspects 1-33, wherein the gas stream has a velocity of about 0.5 feet/second to about 9 feet/second.

Aspect 42—The method of any one of aspects 1-33, wherein the gas stream has a velocity of about 0.5 feet/second to about 8 feet/second.

Aspect 43—The method of any one of aspects 1-33, wherein the gas stream has a velocity of about 0.5 feet/second to about 7 feet/second.

Aspect 44—The method of any one of aspects 1-33, wherein the gas stream has a velocity of about 0.5 feet/second to about 6 feet/second.

Aspect 45—The method of any one of aspects 1-33, wherein the gas stream has a velocity of about 0.5 feet/second to about 5 feet/second.

Aspect 46—The method of any one of aspects 1-33, wherein the gas stream has a velocity of about 0.5 feet/second to about 4 feet/second.

Aspect 47—The method of any one of aspects 1-33, wherein the gas stream has a velocity of about 0.5 feet/second to about 3 feet/second.

Aspect 48—The method of any one of aspects 1-33, wherein the gas stream has a velocity of about 0.5 feet/second to about 2 feet/second.

Aspect 49—The method of any one of aspects 1-33, wherein the gas stream has a velocity of about 0.75 feet/second to about 16 feet/second.

Aspect 50—The method of any one of aspects 1-33, wherein the gas stream has a velocity of about 0.75 feet/second to about 15 feet/second.

Aspect 51—The method of any one of aspects 1-33, wherein the gas stream has a velocity of about 0.75 feet/second to about 14 feet/second.

Aspect 52—The method of any one of aspects 1-33, wherein the gas stream has a velocity of about 0.75 feet/second to about 13 feet/second.

Aspect 53—The method of any one of aspects 1-33, wherein the gas stream has a velocity of about 0.75 feet/second to about 12 feet/second.

Aspect 54—The method of any one of aspects 1-33, wherein the gas stream has a velocity of about 0.75 feet/second to about 11 feet/second.

Aspect 55—The method of any one of aspects 1-33, wherein the gas stream has a velocity of about 0.75 feet/second to about 10 feet/second.

Aspect 56—The method of any one of aspects 1-33, wherein the gas stream has a velocity of about 0.75 feet/second to about 9 feet/second.

Aspect 57—The method of any one of aspects 1-33, wherein the gas stream has a velocity of about 0.75 feet/second to about 8 feet/second.

Aspect 58—The method of any one of aspects 1-33, wherein the gas stream has a velocity of about 0.75 feet/second to about 7 feet/second.

Aspect 59—The method of any one of aspects 1-33, wherein the gas stream has a velocity of about 0.75 feet/second to about 6 feet/second.

Aspect 60—The method of any one of aspects 1-33, wherein the gas stream has a velocity of about 0.75 feet/second to about 5 feet/second.

Aspect 61—The method of any one of aspects 1-33, wherein the gas stream has a velocity of about 0.75 feet/second to about 4 feet/second.

Aspect 62—The method of any one of aspects 1-33, wherein the gas stream has a velocity of about 0.75 feet/second to about 3 feet/second.

Aspect 63—The method of any one of aspects 1-33, wherein the gas stream has a velocity of about 0.75 feet/second to about 2 feet/second.

Aspect 64—The method of any one of aspects 1-33, wherein the gas stream has a velocity of about 0.5 feet/second to about 16 feet/second.

Aspect 65—The method of any one of aspects 1-33, wherein the gas stream has a velocity of about 0.75 feet/second to about 16 feet/second.

Aspect 66—The method of any one of aspects 1-33, wherein the gas stream has a velocity of about 1 feet/second to about 16 feet/second.

Aspect 67—The method of any one of aspects 1-33, wherein the gas stream has a velocity of about 2 feet/second to about 16 feet/second.

Aspect 68—The method of any one of aspects 1-33, wherein the gas stream has a velocity of about 3 feet/second to about 16 feet/second.

Aspect 69—The method of any one of aspects 1-33, wherein the gas stream has a velocity of about 4 feet/second to about 16 feet/second.

Aspect 70—The method of any one of aspects 1-33, wherein the gas stream has a velocity of about 5 feet/second to about 16 feet/second.

Aspect 71—The method of any one of aspects 1-33, wherein the gas stream has a velocity of about 6 feet/second to about 16 feet/second.

Aspect 72—The method of any one of aspects 1-33, wherein the gas stream has a velocity of about 7 feet/second to about 16 feet/second.

Aspect 73—The method of any one of aspects 1-33, wherein the gas stream has a velocity of about 8 feet/second to about 16 feet/second.

Aspect 74—The method of any one of aspects 1-33, wherein the gas stream has a velocity of about 9 feet/second to about 16 feet/second.

Aspect 75—The method of any one of aspects 1-33, wherein the gas stream has a velocity of about 10 feet/second to about 16 feet/second.

Aspect 76—The method of any one of aspects 1-33, wherein the gas stream has a velocity of about 11 feet/second to about 16 feet/second.

Aspect 77—The method of any one of aspects 1-33, wherein the gas stream has a velocity of about 12 feet/second to about 16 feet/second.

Aspect 78—The method of any one of aspects 1-33, wherein the gas stream has a velocity of about 13 feet/second to about 16 feet/second.

Aspect 79—The method of any one of aspects 1-78, wherein the one or more acoustic waves are generated by a first transducer and a spaced apart second transducer.

Aspect 80—The method of aspect 79, wherein the first transducer and the second transducer are adjusted independently to provide the one or more acoustic waves.

Aspect 81—The method of aspect 79 or 80, wherein the one or more acoustic waves are further generated by a third transducer spaced apart from the first transducer and the second transducer.

Aspect 82—The method of aspect 81, wherein the third transducer is adjusted independently.

Aspect 83—The method of any one of aspects 1-82, wherein the modulating frequency is selected from two or more frequencies of about 100 kHz to about 100 MHz.

Aspect 84—The method of any one of aspects 1-82, wherein the modulating frequency is selected from two or more frequencies of about 100 kHz to about 90 MHz.

Aspect 85—The method of any one of aspects 1-82, wherein the modulating frequency is selected from two or more frequencies of about 100 kHz to about 80 MHz.

Aspect 86—The method of any one of aspects 1-82, wherein the modulating frequency is selected from two or more frequencies of about 100 kHz to about 70 MHz.

Aspect 87—The method of any one of aspects 1-82, wherein the modulating frequency is selected from two or more frequencies of about 100 kHz to about 60 MHz.

Aspect 88—The method of any one of aspects 1-82, wherein the modulating frequency is selected from two or more frequencies of about 100 kHz to about 50 MHz.

Aspect 89—The method of any one of aspects 1-82, wherein the modulating frequency is selected from two or more frequencies of about 100 kHz to about 45 MHz.

Aspect 90—The method of any one of aspects 1-82, wherein the modulating frequency is selected from two or more frequencies of about 200 kHz to about 45 MHz.

Aspect 91—The method of any one of aspects 1-82, wherein the modulating frequency is selected from two or more frequencies of about 300 kHz to about 45 MHz.

Aspect 92—The method of any one of aspects 1-82, wherein the modulating frequency is selected from two or more frequencies of about 400 kHz to about 45 MHz.

Aspect 93—The method of any one of aspects 1-82, wherein the modulating frequency is selected from two or more frequencies of about 500 kHz to about 45 MHz.

Aspect 94—The method of any one of aspects 1-82, wherein the modulating frequency is selected from two or more frequencies of about 600 kHz to about 45 MHz.

Aspect 95—The method of any one of aspects 1-82, wherein the modulating frequency is selected from two or more frequencies of about 700 kHz to about 45 MHz.

Aspect 96—The method of any one of aspects 1-82, wherein the modulating frequency is selected from two or more frequencies of about 800 kHz to about 45 MHz.

Aspect 97—The method of any one of aspects 1-82, wherein the channel having a longitudinal axis has a cross-sectional area of about 3 square inches to about 75 square inches.

Aspect 98—The method of any one of aspects 1-82, wherein the channel having a longitudinal axis has a cross-sectional area of about 3 square inches to about 70 square inches.

Aspect 99—The method of any one of aspects 1-82, wherein the channel having a longitudinal axis has a cross-sectional area of about 3 square inches to about 65 square inches.

Aspect 100—The method of any one of aspects 1-82, wherein the channel having a longitudinal axis has a cross-sectional area of about 3 square inches to about 64 square inches.

Aspect 101—The method of any one of aspects 1-82, wherein the channel having a longitudinal axis has a cross-sectional area of about 3 square inches to about 60 square inches.

Aspect 102—The method of any one of aspects 1-82, wherein the channel having a longitudinal axis has a cross-sectional area of about 3 square inches to about 55 square inches.

Aspect 103—The method of any one of aspects 1-82, wherein the channel having a longitudinal axis has a cross-sectional area of about 3 square inches to about 50 square inches.

Aspect 104—The method of any one of aspects 1-82, wherein the channel having a longitudinal axis has a cross-sectional area of about 3 square inches to about 45 square inches.

Aspect 105—The method of any one of aspects 1-82, wherein the channel having a longitudinal axis has a cross-sectional area of about 3 square inches to about 75 square inches.

Aspect 106—The method of any one of aspects 1-82, wherein the channel having a longitudinal axis has a cross-sectional area of about 4 square inches to about 75 square inches.

Aspect 107—The method of any one of aspects 1-82, wherein the channel having a longitudinal axis has a cross-sectional area of about 5 square inches to about 75 square inches.

Aspect 108—The method of any one of aspects 1-82, wherein the channel having a longitudinal axis has a cross-sectional area of about 6 square inches to about 75 square inches.

Aspect 109—The method of any one of aspects 1-82, wherein the channel having a longitudinal axis has a cross-sectional area of about 7 square inches to about 75 square inches.

Aspect 110—The method of any one of aspects 1-82, wherein the channel having a longitudinal axis has a cross-sectional area of about 8 square inches to about 75 square inches.

Aspect 111—The method of any one of aspects 1-82, wherein the channel having a longitudinal axis has a cross-sectional area of about 9 square inches to about 75 square inches.

Aspect 112—The method of any one of aspects 1-82, wherein the channel having a longitudinal axis has a cross-sectional area of about 3 square inches to about 74 square inches.

Aspect 113—The method of any one of aspects 1-82, wherein the channel having a longitudinal axis has a cross-sectional area of about 4 square inches to about 74 square inches.

Aspect 114—The method of any one of aspects 1-82, wherein the channel having a longitudinal axis has a cross-sectional area of about 4 square inches to about 73 square inches.

Aspect 115—The method of any one of aspects 1-82, wherein the channel having a longitudinal axis has a cross-sectional area of about 5 square inches to about 71 square inches.

Aspect 116—The method of any one of aspects 1-82, wherein the channel having a longitudinal axis has a cross-sectional area of about 6 square inches to about 69 square inches.

Aspect 117—The method of any one of aspects 1-82, wherein the channel having a longitudinal axis has a cross-sectional area of about 7 square inches to about 68 square inches.

Aspect 118—The method of any one of aspects 1-82, wherein the channel having a longitudinal axis has a cross-sectional area of about 8 square inches to about 67 square inches.

Aspect 119—The method of any one of aspects 1-82, wherein the channel having a longitudinal axis has a cross-sectional area of about 9 square inches to about 65 square inches.

Aspect 120—The method of any one of aspects 1-82, wherein the channel having a longitudinal axis has a cross-sectional area of about 9 square inches to about 64 square inches.

Aspect 121—The method of any one of aspects 1-120, further including adjusting one or more of the gas stream velocity, the intensity, and/or the modulating frequency to transport the at least a portion of the particulates.

Aspect 122—The method of any one of aspects 1-120, further including adjusting the gas stream velocity to transport the at least a portion of the particulates.

Aspect 123—The method of any one of aspects 1-120, further including adjusting the gas stream velocity, and the intensity to transport the at least a portion of the particulates.

Aspect 124—The method of any one of aspects 1-120, further including adjusting the gas stream velocity, and the modulating frequency to transport the at least a portion of the particulates.

Aspect 125—The method of any one of aspects 1-120, further including adjusting the gas stream velocity, the intensity, and the modulating frequency to transport the at least a portion of the particulates.

Aspect 126—The method of any one of aspects 1-120, further including adjusting the intensity to transport the at least a portion of the particulates.

Aspect 127—The method of any one of aspects 1-120, further including adjusting the modulating frequency to transport the at least a portion of the particulates.

Aspect 128—The method of any one of aspects 1-120, further including adjusting the intensity and the modulating frequency to transport the at least a portion of the particulates.

Aspect 129—A method of capturing particulates, the method including providing a gas stream in a channel having a longitudinal axis, the gas stream including particulates; contacting the particulates with one or more standing acoustic waves extending transverse to the longitudinal axis to immobilize at least a portion of the particulates; and contacting the at least a portion of the particulates with an electrostatic force to (i) transport the at least a portion of the particulates to a quiescent zone of the channel, (ii) promote agglomeration of the at least a portion of the particulates, or (iii) a combination thereof.

Aspect 130—The method of aspect 129, wherein the channel includes a first section hosting the gas stream, and a second section comprising a substantially stationary gas, wherein the at least a portion of the particulates transported to the quiescent zone are deposited in the second section.

Aspect 131—The method of aspect 129 or 130, wherein the agglomeration of the at least a portion of the particulates forms agglomerates of particulates having a mass sufficient to prevent a force exerted on the agglomerates of particulates by the gas stream from exceeding a force of gravity.

Aspect 132—The method of any one of aspects 129-131, wherein the particulates have an average particulate size of about 1 μm to about 110 μm.

Aspect 133—The method of any one of aspects 129-131, wherein the particulates have an average particulate size of about 1 μm to about 105 μm.

Aspect 134—The method of any one of aspects 129-131, wherein the particulates have an average particulate size of about 2 μm to about 105 μm.

Aspect 135—The method of any one of aspects 129-131, wherein the particulates have an average particulate size of about 2 μm to about 100 μm.

Aspect 136—The method of any one of aspects 129-131, wherein the particulates have an average particulate size of about 2 μm to about 90 μm.

Aspect 137—The method of any one of aspects 129-131, wherein the particulates have an average particulate size of about 2 μm to about 80 μm.

Aspect 138—The method of any one of aspects 129-131, wherein the particulates have an average particulate size of about 2 μm to about 70 μm.

Aspect 139—The method of any one of aspects 129-131, wherein the particulates have an average particulate size of about 2 μm to about 60 μm.

Aspect 140—The method of any one of aspects 129-131, wherein the particulates have an average particulate size of about 2 μm to about 50 μm.

Aspect 141—The method of any one of aspects 129-131, wherein the particulates have an average particulate size of about 2 μm to about 40 μm.

Aspect 142—The method of any one of aspects 129-131, wherein the particulates have an average particulate size of about 2 μm to about 30 μm.

Aspect 143—The method of any one of aspects 129-131, wherein the particulates have an average particulate size of about 2 μm to about 20 μm.

Aspect 144—The method of any one of aspects 129-131, wherein the particulates have an average particulate size of about 2 μm to about 10 μm.

Aspect 145—The method of any one of aspects 129-131, wherein the particulates have an average particulate size of about 5 μm to about 105 μm.

Aspect 146—The method of any one of aspects 129-131, wherein the particulates have an average particulate size of about 5 μm to about 100 μm.

Aspect 147—The method of any one of aspects 129-131, wherein the particulates have an average particulate size of about 5 μm to about 90 μm.

Aspect 148—The method of any one of aspects 129-131, wherein the particulates have an average particulate size of about 5 μm to about 80 μm.

Aspect 149—The method of any one of aspects 129-131, wherein the particulates have an average particulate size of about 5 μm to about 70 μm.

Aspect 150—The method of any one of aspects 129-131, wherein the particulates have an average particulate size of about 5 μm to about 60 μm.

Aspect 151—The method of any one of aspects 129-131, wherein the particulates have an average particulate size of about 5 μm to about 50 μm.

Aspect 152—The method of any one of aspects 129-131, wherein the particulates have an average particulate size of about 5 μm to about 40 μm.

Aspect 153—The method of any one of aspects 129-131, wherein the particulates have an average particulate size of about 5 μm to about 30 μm.

Aspect 154—The method of any one of aspects 129-131, wherein the particulates have an average particulate size of about 5 µm to about 20 µm.

Aspect 155—The method of any one of aspects 129-131, wherein the particulates have an average particulate size of about 5 µm to about 10 µm.

Aspect 156—The method of any one of aspects 129-155, wherein the particulates include a phosphite processing stabilizer.

Aspect 157—The method of any one of aspects 129-156, wherein the particulates include IRGAFOX® 168 hydrolytically stable phosphite processing stabilizer (CIBA®, USA).

Aspect 158—The method of any one of aspects 129-157, wherein the particulates include an antioxidant stabilizer.

Aspect 159—The method of any one of aspects 129-158, wherein the particulates include IRGANOX® 1010 phenolic antioxidant stabilizer (BASF, USA).

Aspect 160—The method of any one of aspects 129-159, wherein the particulates include polyethylene fines, catalyst fines, or a combination thereof.

Aspect 161—The method of any one of aspects 129-160, wherein the gas stream has a velocity of about 0.5 feet/second to about 16 feet/second.

Aspect 162—The method of any one of aspects 129-160, wherein the gas stream has a velocity of about 0.5 feet/second to about 15 feet/second.

Aspect 163—The method of any one of aspects 129-160, wherein the gas stream has a velocity of about 0.5 feet/second to about 14 feet/second.

Aspect 164—The method of any one of aspects 129-160, wherein the gas stream has a velocity of about 0.5 feet/second to about 13 feet/second.

Aspect 165—The method of any one of aspects 129-160, wherein the gas stream has a velocity of about 0.5 feet/second to about 12 feet/second.

Aspect 166—The method of any one of aspects 129-160, wherein the gas stream has a velocity of about 0.5 feet/second to about 11 feet/second.

Aspect 167—The method of any one of aspects 129-160, wherein the gas stream has a velocity of about 0.5 feet/second to about 10 feet/second.

Aspect 168—The method of any one of aspects 129-160, wherein the gas stream has a velocity of about 0.5 feet/second to about 9 feet/second.

Aspect 169—The method of any one of aspects 129-160, wherein the gas stream has a velocity of about 0.5 feet/second to about 8 feet/second.

Aspect 170—The method of any one of aspects 129-160, wherein the gas stream has a velocity of about 0.5 feet/second to about 7 feet/second.

Aspect 171—The method of any one of aspects 129-160, wherein the gas stream has a velocity of about 0.5 feet/second to about 6 feet/second.

Aspect 172—The method of any one of aspects 129-160, wherein the gas stream has a velocity of about 0.5 feet/second to about 5 feet/second.

Aspect 173—The method of any one of aspects 129-160, wherein the gas stream has a velocity of about 0.5 feet/second to about 4 feet/second.

Aspect 174—The method of any one of aspects 129-160, wherein the gas stream has a velocity of about 0.5 feet/second to about 3 feet/second.

Aspect 175—The method of any one of aspects 129-160, wherein the gas stream has a velocity of about 0.5 feet/second to about 2 feet/second.

Aspect 176—The method of any one of aspects 129-160, wherein the gas stream has a velocity of about 0.75 feet/second to about 16 feet/second.

Aspect 177—The method of any one of aspects 129-160, wherein the gas stream has a velocity of about 0.75 feet/second to about 15 feet/second.

Aspect 178—The method of any one of aspects 129-160, wherein the gas stream has a velocity of about 0.75 feet/second to about 14 feet/second.

Aspect 179—The method of any one of aspects 129-160, wherein the gas stream has a velocity of about 0.75 feet/second to about 13 feet/second.

Aspect 180—The method of any one of aspects 129-160, wherein the gas stream has a velocity of about 0.75 feet/second to about 12 feet/second.

Aspect 181—The method of any one of aspects 129-160, wherein the gas stream has a velocity of about 0.75 feet/second to about 11 feet/second.

Aspect 182—The method of any one of aspects 129-160, wherein the gas stream has a velocity of about 0.75 feet/second to about 10 feet/second.

Aspect 183—The method of any one of aspects 129-160, wherein the gas stream has a velocity of about 0.75 feet/second to about 9 feet/second.

Aspect 184—The method of any one of aspects 129-160, wherein the gas stream has a velocity of about 0.75 feet/second to about 8 feet/second.

Aspect 185—The method of any one of aspects 129-160, wherein the gas stream has a velocity of about 0.75 feet/second to about 7 feet/second.

Aspect 186—The method of any one of aspects 129-160, wherein the gas stream has a velocity of about 0.75 feet/second to about 6 feet/second.

Aspect 187—The method of any one of aspects 129-160, wherein the gas stream has a velocity of about 0.75 feet/second to about 5 feet/second.

Aspect 188—The method of any one of aspects 129-160, wherein the gas stream has a velocity of about 0.75 feet/second to about 4 feet/second.

Aspect 189—The method of any one of aspects 129-160, wherein the gas stream has a velocity of about 0.75 feet/second to about 3 feet/second.

Aspect 190—The method of any one of aspects 129-160, wherein the gas stream has a velocity of about 0.75 feet/second to about 2 feet/second.

Aspect 191—The method of any one of aspects 129-160, wherein the gas stream has a velocity of about 0.5 feet/second to about 16 feet/second.

Aspect 192—The method of any one of aspects 129-160, wherein the gas stream has a velocity of about 0.75 feet/second to about 16 feet/second.

Aspect 193—The method of any one of aspects 129-160, wherein the gas stream has a velocity of about 1 feet/second to about 16 feet/second.

Aspect 194—The method of any one of aspects 129-160, wherein the gas stream has a velocity of about 2 feet/second to about 16 feet/second.

Aspect 195—The method of any one of aspects 129-160, wherein the gas stream has a velocity of about 3 feet/second to about 16 feet/second.

Aspect 196—The method of any one of aspects 129-160, wherein the gas stream has a velocity of about 4 feet/second to about 16 feet/second.

Aspect 197—The method of any one of aspects 129-160, wherein the gas stream has a velocity of about 5 feet/second to about 16 feet/second.

Aspect 198—The method of any one of aspects 129-160, wherein the gas stream has a velocity of about 6 feet/second to about 16 feet/second.

Aspect 199—The method of any one of aspects 129-160, wherein the gas stream has a velocity of about 7 feet/second to about 16 feet/second.

Aspect 200—The method of any one of aspects 129-160, wherein the gas stream has a velocity of about 8 feet/second to about 16 feet/second.

Aspect 201—The method of any one of aspects 129-160, wherein the gas stream has a velocity of about 9 feet/second to about 16 feet/second.

Aspect 202—The method of any one of aspects 129-160, wherein the gas stream has a velocity of about 10 feet/second to about 16 feet/second.

Aspect 203—The method of any one of aspects 129-160, wherein the gas stream has a velocity of about 11 feet/second to about 16 feet/second.

Aspect 204—The method of any one of aspects 129-160, wherein the gas stream has a velocity of about 12 feet/second to about 16 feet/second.

Aspect 205—The method of any one of aspects 129-160, wherein the gas stream has a velocity of about 13 feet/second to about 16 feet/second.

Aspect 206—The method of any one of aspects 129-205, wherein the one or more standing acoustic waves are generated by a first transducer and a spaced apart second transducer.

Aspect 207—The method of aspect 206, wherein the first transducer and the second transducer are adjusted independently to provide the one or more standing acoustic waves.

Aspect 208—The method of aspect 206 or 207, wherein the one or more standing acoustic waves are further generated by a third transducer spaced apart from the first transducer and the second transducer.

Aspect 209—The method of aspect 208, wherein the third transducer is adjusted independently.

Aspect 210—A system for capturing particulates, the system including a chemical apparatus; a gas stream channel having a longitudinal axis associated with the chemical apparatus; and a two or more transducers associated with the gas stream channel; wherein the two or more transducers are configured to provide one or more acoustic waves in the gas stream channel, transversely to the longitudinal axis.

Aspect 211—The system of aspect 210, further including an apparatus for providing an electrostatic force in the gas stream channel.

Aspect 212—The system of aspect 210 or 211, wherein the one or more acoustic waves includes a standing acoustic wave.

Aspect 213—The system of any one of aspects 210-212, wherein the standing acoustic wave has a frequency of about 100 kHz to about 100 MHz.

Aspect 214—The system of any one of aspects 210-212, wherein the standing acoustic wave has a frequency of about 100 kHz to about 90 MHz.

Aspect 215—The system of any one of aspects 210-212, wherein the standing acoustic wave has a frequency of about 100 kHz to about 80 MHz.

Aspect 216—The system of any one of aspects 210-212, wherein the standing acoustic wave has a frequency of about 100 kHz to about 70 MHz.

Aspect 217—The system of any one of aspects 210-212, wherein the standing acoustic wave has a frequency of about 100 kHz to about 60 MHz.

Aspect 218—The system of any one of aspects 210-212, wherein the standing acoustic wave has a frequency of about 100 kHz to about 50 MHz.

Aspect 219—The system of any one of aspects 210-212, wherein the standing acoustic wave has a frequency of about 100 kHz to about 45 MHz.

Aspect 220—The system of any one of aspects 210-212, wherein the standing acoustic wave has a frequency of about 200 kHz to about 45 MHz.

Aspect 221—The system of any one of aspects 210-212, wherein the standing acoustic wave has a frequency of about 300 kHz to about 45 MHz.

Aspect 222—The system of any one of aspects 210-212, wherein the standing acoustic wave has a frequency of about 400 kHz to about 45 MHz.

Aspect 223—The system of any one of aspects 210-212, wherein the standing acoustic wave has a frequency of about 500 kHz to about 45 MHz.

Aspect 224—The system of any one of aspects 210-212, wherein the standing acoustic wave has a frequency of about 600 kHz to about 45 MHz.

Aspect 225—The system of any one of aspects 210-212, wherein the standing acoustic wave has a frequency of about 700 kHz to about 45 MHz.

Aspect 226—The system of any one of aspects 210-212, wherein the standing acoustic wave has a frequency of about 800 kHz to about 45 MHz.

Aspect 227—The system of any one of aspects 210-212, wherein the one or more acoustic waves comprises an acoustic wave of modulating frequency.

Aspect 228—The system of any one of aspects 227, wherein the modulating frequency is selected from two or more frequencies of about 100 kHz to about 100 MHz.

Aspect 229—The system of any one of aspects 227, wherein the modulating frequency is selected from two or more frequencies of about 100 kHz to about 90 MHz.

Aspect 230—The system of any one of aspects 227, wherein the modulating frequency is selected from two or more frequencies of about 100 kHz to about 80 MHz.

Aspect 231—The system of any one of aspects 227, wherein the modulating frequency is selected from two or more frequencies of about 100 kHz to about 70 MHz.

Aspect 232—The system of any one of aspects 227, wherein the modulating frequency is selected from two or more frequencies of about 100 kHz to about 60 MHz.

Aspect 233—The system of any one of aspects 227, wherein the modulating frequency is selected from two or more frequencies of about 100 kHz to about 50 MHz.

Aspect 234—The system of any one of aspects 227, wherein the modulating frequency is selected from two or more frequencies of about 100 kHz to about 45 MHz.

Aspect 235—The system of any one of aspects 227, wherein the modulating frequency is selected from two or more frequencies of about 200 kHz to about 45 MHz.

Aspect 236—The system of any one of aspects 227, wherein the modulating frequency is selected from two or more frequencies of about 300 kHz to about 45 MHz.

Aspect 237—The system of any one of aspects 227, wherein the modulating frequency is selected from two or more frequencies of about 400 kHz to about 45 MHz.

Aspect 238—The system of any one of aspects 227, wherein the modulating frequency is selected from two or more frequencies of about 500 kHz to about 45 MHz.

Aspect 239—The system of any one of aspects 227, wherein the modulating frequency is selected from two or more frequencies of about 600 kHz to about 45 MHz.

Aspect 240—The system of any one of aspects 227, wherein the modulating frequency is selected from two or more frequencies of about 700 kHz to about 45 MHz.

Aspect 241—The system of any one of aspects 227, wherein the modulating frequency is selected from two or more frequencies of about 800 kHz to about 45 MHz.

Aspect 242—The system of any one of aspects 129-241, wherein the chemical apparatus includes a hopper containing particulates, an extruder feed conveying blender, or a fluidized bed reactor.

Aspect 243—The system of any one of aspects 210-241, wherein the chemical apparatus includes a hopper containing particulates.

Aspect 244—The system of any one of aspects 210-241, wherein the chemical apparatus includes an extruder feed conveying blender.

Aspect 245—The system of any one of aspects 210-241, wherein the chemical apparatus includes a fluidized bed reactor.

Aspect 246—The system of aspect 242 or 243, wherein the hopper containing particulates is an additive feed hopper.

Aspect 247—The system of any one of aspects 242, 243, or 246, wherein the hopper is configured to be refilled manually.

Aspect 248—The system of any one of aspects 242, 243, 246, or 247, wherein the hopper includes one or more vents routed to a dust collection system.

Aspect 249—The system of aspect 242 or 244, wherein the conveying blender includes one or more vents routed to a dust collection system.

Aspect 250—The system of aspect 248 or 249, wherein each vent has a largest dimension of about 3" to about 10", or about 3" to about 8".

Aspect 251—The system of aspect 248 or 249, wherein each vent has a cross-sectional area of about 7 square inches to about 75 square inches.

Aspect 252—The system of aspect 248 or 249, wherein each vent has a cross-sectional area of about 9 square inches to about 64 square inches.

Aspect 253—The system of any one of aspects 210-252, wherein the chemical apparatus includes a vent filter.

Aspect 254—The system of aspect 253, wherein the vent filter is configured to remove particulates less than 2 microns in diameter.

Aspect 255—The system of aspect 243 or 245, wherein the fluidized bed reactor comprises a catalyst activator or a polymerization reactor.

Aspect 256—The system of aspect 255, wherein the catalyst activator is a polymerization catalyst activator.

Aspect 257—The system of any one of aspects 210-256, wherein the gas stream channel hosts a gas stream comprising one or more chemical additives initially disposed in the hopper.

Aspect 258—The system of any one of aspects 210-256, wherein the gas stream channel hosts a gas stream comprising particulates entrained in a fluid of the fluidized bed reactor.

The invention claimed is:

1. A method of capturing particulates, the method comprising:
   providing a gas stream in a channel having a longitudinal axis, the gas stream having a velocity and comprising particulates; and
   contacting the particulates with one or more acoustic waves having an intensity and a modulating frequency to transport at least a portion of the particulates transversely to the longitudinal axis to a quiescent zone of the channel;
   wherein the channel comprises a first section hosting the gas stream, and a second section comprising a substantially stationary gas, wherein the at least a portion of the particulates transported to the quiescent zone are deposited in the second section of the channel.

2. The method of claim 1, wherein the particulates have an average particulate size of about 1 μm to about 110 μm.

3. The method of claim 1, wherein the particulates have an average particulate size of about 5 μm to about 50 μm.

4. The method of claim 1, wherein the gas stream has a velocity of about 0.5 feet/second to about 3 feet/second.

5. The method of claim 1, wherein the gas stream has a velocity of about 0.75 feet/second to about 2 feet/second.

6. The method of claim 1, wherein the one or more acoustic waves are generated by a first transducer and a spaced apart second transducer which are adjusted independently to provide the one or more acoustic waves.

7. The method of claim 6, wherein the one or more acoustic waves are further generated by a third transducer spaced apart from the first transducer and the second transducer, the third transducer being adjusted independently to provide the one or more acoustic waves.

8. The method of claim 1, wherein the modulating frequency is selected from two or more frequencies of about 100 kHz to about 100 MHz.

9. The method of claim 1, wherein the modulating frequency is selected from two or more frequencies of about 0.8 MHz to about 45 MHz.

10. The method of claim 1, wherein the channel has a cross-sectional area of about 7 square inches to about 75 square inches.

11. The method of claim 1, wherein the channel has a cross-sectional area of about 9 square inches to about 64 square inches.

12. The method of claim 1, further comprising adjusting one or more of the gas stream velocity, the intensity, or the modulating frequency to transport the at least a portion of the particulates.

* * * * *